June 17, 1930.                S. VERNET                    1,763,838
                             RADIATOR SHUTTER
                         Original Filed Oct. 10, 1925
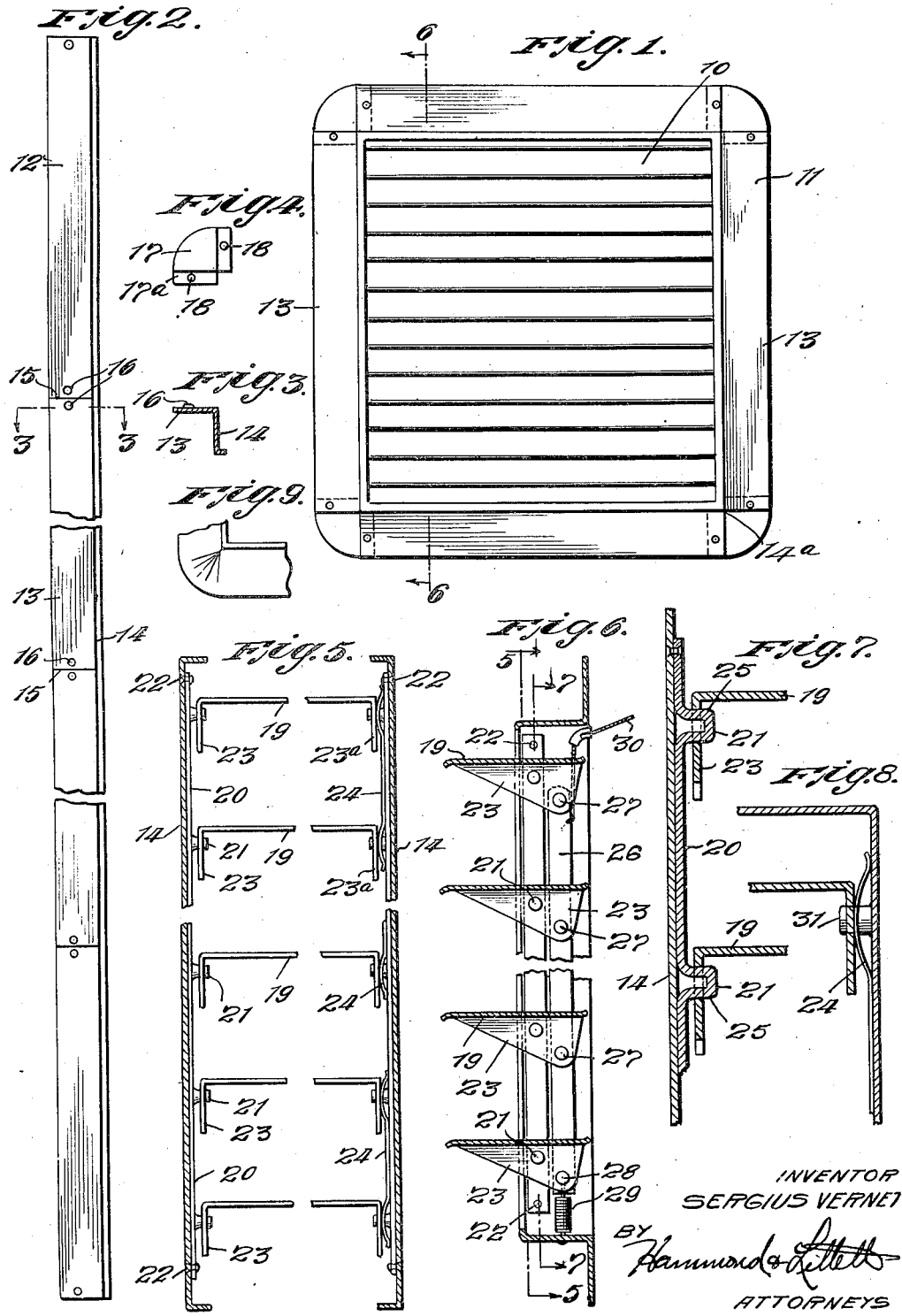

Patented June 17, 1930

1,763,838

UNITED STATES PATENT OFFICE

SERGIUS VERNET, OF BROOKLYN, NEW YORK

RADIATOR SHUTTER

Original application filed October 10, 1925, Serial No. 61,646. Divided and this application filed September 29, 1926. Serial No. 138,392.

This invention relates to improvements in shutters or winter fronts to regulate the flow of air through the radiators of automotive internal combustion engines.

One of the objects of the invention is to provide a radiator shutter which is simple and easily and cheaply manufactured.

Another object of the invention is to provide means to pivotally mount the vanes of a radiator shutter without the use of separate pins or rivets, thereby eliminating the possibility of the rivets becoming loose and rattling.

Another object of the invention is to provide a shutter for radiators which is ruggedly built and which will not loosen up or rattle.

Another object of the invention is to provide a method of making radiator shutters in which the labor and time required to assemble the same will be reduced to an absolute minimum.

This application is a division of my copending application entitled "Radiator shutters and method of making the same", filed October 10, 1925, Serial No. 61,646.

Other objects of the invention will appear as the description proceeds.

One embodiment of the invention has been illustrated in the accompanying drawings, in which:

Figure 1 is a front elevational view of a shutter embodying my invention with the vanes open;

Figure 2 is a plan view of a strip of metal from which the frame of the shutter is made;

Figure 3 is a sectional view of the strip, taken on the line 3—3 of Figure 2;

Figure 4 is a plan view of a plate used in each corner of the radiator shutter;

Figure 5 is an enlarged front sectional view of a portion of the radiator shutter shown in Figure 1 and taken on the line 5—5 of Figure 6;

Figure 6 is a sectional side view of the radiator shutter taken on the line 6—6 of Figure 1;

Figure 7 is an enlarged sectional view of a portion of the shutter taken on the line 7—7 of Figure 6;

Figure 8 is an enlarged sectional view of a portion of a shutter showing a modified construction; and Figure 9 is a plan view of a modified construction of the corner of the radiator shutter.

Referring now more specifically to the drawings, the radiator shutter 10 comprises a frame 11 composed of a single strip 12 of shutter forming material and bent to the cross section shown in Figure 3. A portion 13 forms the outside flange of the shutter and another portion 14 forms the enclosure for the vanes. The flange portion 13 of the strip 12 is transversely slotted at a plurality of places 15 so that the portion 14 may be bent adjacent each slot to conform to the outline of the radiator and form the frame of the radiator shutter. The extreme ends of the portion 14 are welded together at 14$^a$ or joined in any suitable manner. The flange portion 13 of the strip 12 may be provided with slightly raised portions 16 adjacent the slots and a corner plate 17 may also be provided with raised portions 18, which cooperate with the raised portions 16 of the flanges 13, so that the corners may be quickly and accurately placed in position. The ends 17$^a$ of the corner plates 17 are offset so that they may be placed beneath the ends of the flange 13, keeping the corner plates flush with the surface of the flange 13. The corners are then spot-welded in place.

The shutter is provided with a plurality of vanes 19, which are pivotally mounted between two opposite sides of the frame. In order to mount these vanes, metallic strips 20 are provided, which have been subjected to a series of drawing operations whereby uniformly spaced tubular projections 21 are raised from the surface thereof in a manner well known in the art of metal working. The strips are attached to the side portions 14 of the radiator shutter frame by rivets 22 or they may be spot-welded in place if desired. The shutter vanes 19 comprise single strips of metal with end portions or vanes 23 and 23$^a$ bent over to form bearings therefor. The end portions 23 and 23ª of the shutter vanes have holes therethrough and the projections 21 on the strips 20 fit into these holes whereby the vanes are pivotally mounted therebetween. Flat leaf springs 24 between one end 23ª of the radiator vanes and the side of the frame urge the vanes toward the opposite side and as the projections 21 have tapered sides 25, the vanes are kept snugly thereagainst and are prevented from rattling. As the holes in the vanes grow larger through wear, the springs 24 press the vanes further up on the sloping sides of the projections 21 and hence the wear is taken up and the vanes are prevented from rattling during the life of the shutter.

A second strip 26, constructed similarly to the strips 20, with spaced projections 27 thereon is disposed between the end portions 23 of the vanes 19 and the side portion 14 of the frame of the shutter, and the projections 27 passed through holes 28 in the ends 23 of the vanes. The strip 26 is free to reciprocate, thereby closing and opening the vanes of the shutter. A spring 29, normally holds the strip 26 at its lowermost position and the vanes of the shutter open. A cable 30 is attached to the upper part of the strip 26 and is adapted to be remotely controlled, as from the instrument board of the car. When the cable 30 is pulled, the strip 26 is moved upwardly and the vanes assume a substantially vertical position and are closed.

Instead of using the separate strips 20, projections 31 may be raised directly on the frame 14' of the shutter, as shown in Figure 8. Also, instead of using a separate corner plate 17 and welding it in place, the strip forming the frame may be made of heavier material and the flange 13 may be stretched around the corners as indicated in Figure 9, making the radiator frame completely out of one piece of metal.

From the foregoing, it will be evident that I have invented a radiator shutter the parts of which may be easily manufactured and as easily assembled. The frame may be made substantially out of one piece of metal and quickly bent into the proper form and the ends welded or joined in any suitable manner. Because the pivots for the vanes are made integral with a metallic strip, the entire row of pivots for each side may be attached to the frame at once, thus eliminating the slow process of picking up and inserting each rivet or pin separately as has been done before. The shutter thus assembled is ruggedly constructed, light in weight, presents a compact, neat appearance, and the vanes are snugly held in place, thereby preventing rattling.

While I have illustrated and described one embodiment of my invention, there are many modifications which might be resorted to without departing from the spirit of the invention, and I do not, therefore, desire to limit myself to the specific embodiment shown, but to interpret the invention broadly within the scope of the appended claim.

What I claim as my invention is:

An anti-squeak and rattle shutter for radiators of internal combustion engines comprising a one-piece rigid frame; a plurality of vanes having their ends bent at right angles to the axis of said vanes and pivotally mounted in the frame; a single strip rigidly attached to each side of the frame interiorly thereof adjacent the ends of said vanes; spaced unbroken projections formed from and integral with said strip, said projections acting as bearings for the vanes; a second strip at one side of the frame adjacent one of the first-mentioned strips; projections on and integral with said second strip, each of said vanes having a hole at one end eccentric of the rotating axis of said vanes and into which one of said projections on said second strip fits, whereby said second strip is supported between said vanes and said frame; a spring secured to one end of said second strip and to the frame to normally urge said vanes into open position; means for moving the second strip against the action of said spring to close the vanes and a plurality of spring elements interposed between one of the strips secured on the frame and an end of each vane and bearing directly against said end to normally urge the vanes against their pivots.

In testimony whereof I have affixed my signature to this specification.

SERGIUS VERNET.